United States Patent [19]
Ono

[11] Patent Number: 5,444,555
[45] Date of Patent: Aug. 22, 1995

[54] IMAGE READING APPARATUS AND METHOD FOR READING A DOCUMENT DURING ACCELERATION OR DECELERATION OF A STEPPING MOTOR

[75] Inventor: Takashi Ono, Yokosuka, Japan

[73] Assignee: Canon Kabushiki Kaisha, Tokyo, Japan

[21] Appl. No.: 64,891

[22] Filed: May 24, 1993

[30] Foreign Application Priority Data

May 27, 1992 [JP]  Japan .................................. 4-135048

[51] Int. Cl.⁶ ...................... H04N 1/04; H04N 1/047; H04N 1/10; H04N 1/12
[52] U.S. Cl. .................................... 358/494; 358/496; 358/497; 358/498
[58] Field of Search ............... 358/496, 497, 498, 474, 358/486, 482, 483, 505, 513, 514

[56] References Cited

U.S. PATENT DOCUMENTS 4,628,368  12/1986  Kurata et al. ...................... 358/497
4,926,270   5/1990  Sakamoto ........................... 358/498

FOREIGN PATENT DOCUMENTS 0260892  3/1988  European Pat. Off. .
0371800  6/1990  European Pat. Off. .
4-54761  2/1992  Japan .

*Primary Examiner*—Scott A. Rogers
*Attorney, Agent, or Firm*—Fitzpatrick, Cella, Harper & Scinto

[57] ABSTRACT

An image reading apparatus includes a reading device for reading a document to generate image data, and for outputting the image data at a predetermined cycle. A reading control unit receives the image data output by the reading device. A moving device, driven by a driving unit, moves the document and the reading device relative to each other. A timing control unit controls (i) a driving timing of the driving unit, and (ii) a data timing at which the image data output from the reading device is received by the reading control unit. The timing control unit controls the driving timing and the data timing such that a moving speed of the document is accelerated, and the image data output from the reading device is selectively received by the reading control unit in accordance with the driving timing.

103 Claims, 7 Drawing Sheets

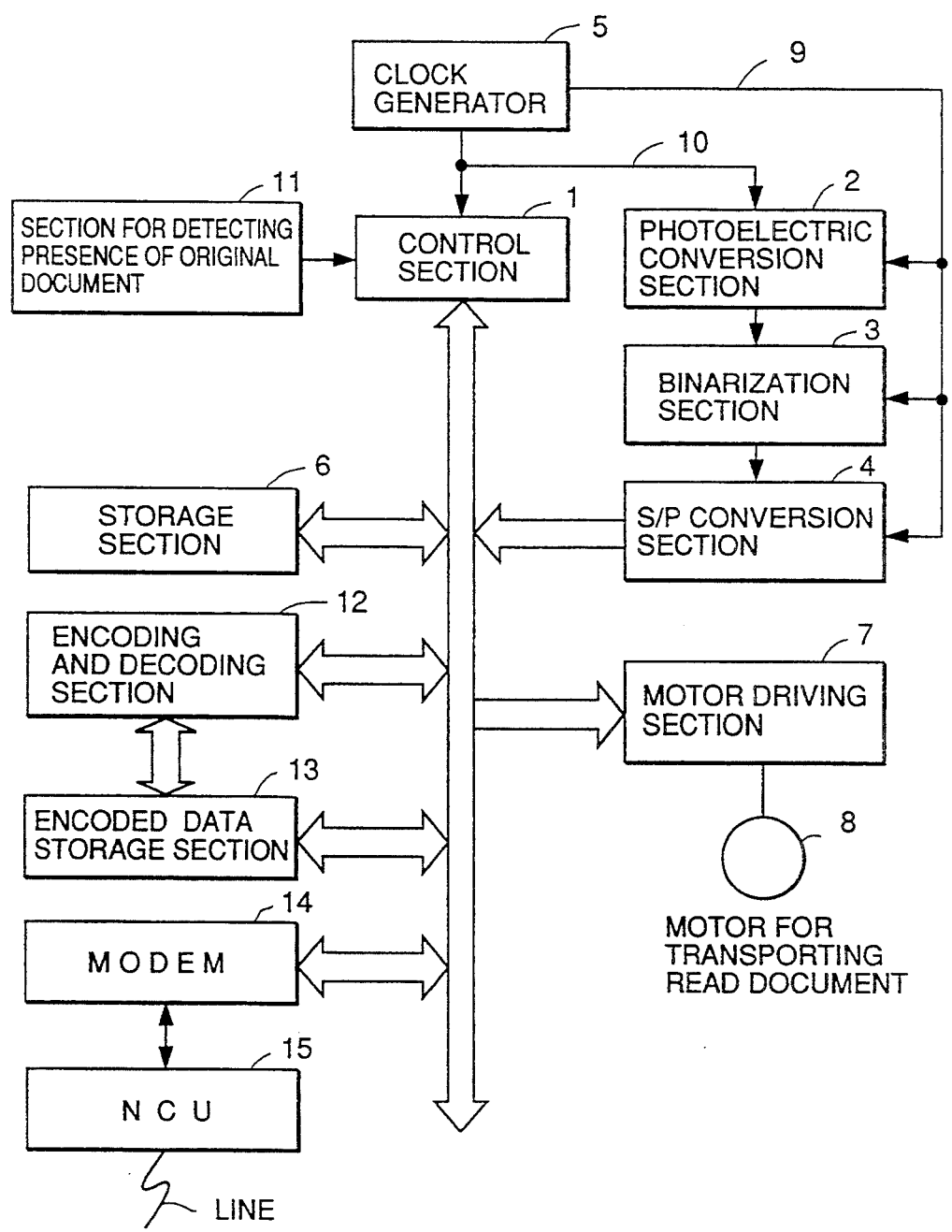

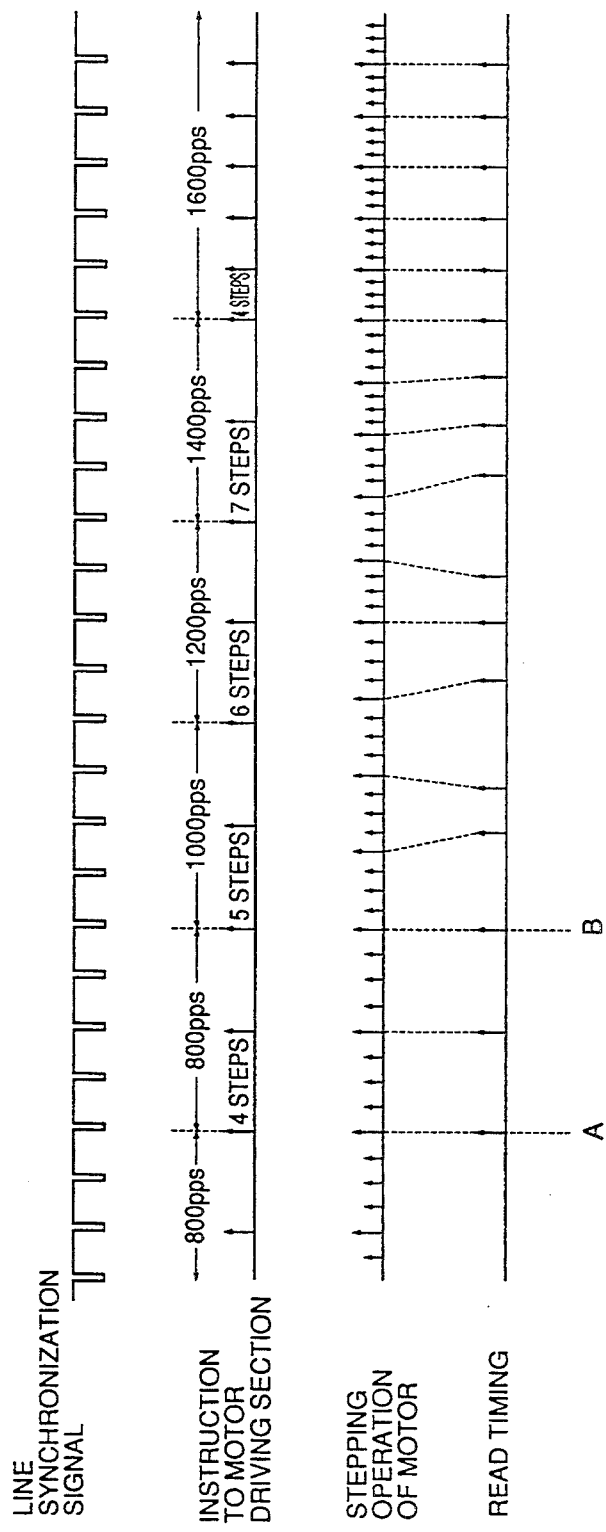

| ADDRESS | READ | MOTOR | STEP RATE | NUMBER OF STEPS |
|---------|------|-------|-----------|-----------------|
| 1 | 1 | 1 | 000 | 011 |
| 2 | 0 | 0 | *** | *** |
| 3 | 1 | 1 | 000 | 011 |
| 4 | 0 | 0 | *** | *** |
| 5 | 1 | 1 | 001 | 100 |
| 6 | 0 | 0 | *** | *** |
| 7 | 1 | 1 | 001 | 100 |
| 8 | 1 | 0 | *** | *** |
| 9 | 0 | 1 | 010 | 101 |
| 10 | 1 | 0 | *** | *** |
| 11 | 1 | 1 | 010 | 101 |
| 12 | 1 | 0 | *** | *** |
| 13 | 0 | 1 | 011 | 110 |
| 14 | 1 | 0 | *** | *** |
| 15 | 1 | 1 | 011 | 110 |
| 16 | 1 | 0 | *** | *** |
| 17 | 1 | 1 | 100 | 011 |

STEP RATE
000 : 800pps
001 : 1000pps
010 : 1200pps
011 : 1400pps
100 : 1600pps

NUMBER OF STEPS
000 : 1
001 : 2
010 : 3
⋮   ⋮
111 : 8

* : 0 or 1

| ADDRESS | READ | MOTOR | STEP RATE | NUMBER OF STEPS |
|---|---|---|---|---|
| 1 | 1 | 1 | 100 | 011 |
| 2 | 1 | 1 | 011 | 110 |
| 3 | 1 | 0 | *** | *** |
| 4 | 1 | 1 | 011 | 110 |
| 5 | 1 | 0 | *** | *** |
| 6 | 0 | 1 | 010 | 101 |
| 7 | 1 | 0 | *** | *** |
| 8 | 1 | 1 | 010 | 101 |
| 9 | 1 | 0 | *** | *** |
| 10 | 0 | 1 | 001 | 100 |
| 11 | 1 | 0 | *** | *** |
| 12 | 1 | 1 | 001 | 100 |
| 13 | 0 | 0 | *** | *** |
| 14 | 1 | 1 | 000 | 011 |
| 15 | 0 | 0 | *** | *** |
| 16 | 1 | 1 | 000 | 011 |
| 17 | 0 | 0 | *** | *** |

STEP RATE
000 : 800pps
001 : 1000pps
010 : 1200pps
011 : 1400pps
100 : 1600pps

NUMBER OF STEPS
000 : 1
001 : 2
010 : 3
⋮  ⋮
111 : 8

| ADDRESS | READ | MOTOR | STEP RATE | NUMBER OF STEPS |
|---------|------|-------|-----------|-----------------|
| 1 | 1 | 1 | 1 0 0 | 0 1 1 |
| 2 | 1 | 1 | 1 0 0 | 0 1 1 |
| 3 | 1 | 1 | 0 1 0 | 1 0 1 |
| 4 | 1 | 0 | * * * | * * * |
| 5 | 0 | 1 | 0 0 0 | 1 0 1 |
| 6 | 1 | 0 | * * * | * * * |
| 7 | 0 | 0 | * * * | * * * |

IMAGE READING APPARATUS AND METHOD FOR READING A DOCUMENT DURING ACCELERATION OR DECELERATION OF A STEPPING MOTOR

BACKGROUND OF THE INVENTION

1. Field of the Invention

The present invention relates to an image reading apparatus having a reading means for reading the image of an original document. The document and the reading means are moved relative to each other by means of a stepping motor, and the image of the original document is read even while the stepping motor is being accelerated or decelerated.

2. Description of The Related Art

Generally, in a stepping motor, the pull-in torque thereof decreases with an increase in the rotational speed thereof. It is impossible to make a motor rotate suddenly at a speed exceeding the minimum self-start frequency. Therefore, when a motor is rotated where the pull-in torque is small or where the rotation speed exceeds the minimum self-start frequency, acceleration control must be performed so that the speed is gradually increased starting from a speed with a large pull-in torque.

Hitherto, an image reading apparatus for reading the image of a document using a stepping motor by causing a document and reading means to move relative to each other and by controlling the acceleration of the stepping motor has been constructed as described below.

The document is set in a document tray in an image reading apparatus in which a document is fed. The document begins to be fed from the set position, and acceleration control is terminated by the time the document reaches the position at which the image of the document is read.

In an image reading apparatus featuring a moving-type optical system in which a document set in a document tray is read by moving the optical system, the optical system begins to move from the home position, and acceleration control is terminated by the time the document reaches the reading position in the document holder.

However, in the related art, when the reading operation is suspended due to a memory overflow or the like during the reading operation, the stopped position and hence, the reading position, is in the middle of the document. The related art has a problem in that if the reading operation is restarted from the position at which the reading is stopped, and if acceleration control for making the reading speed constant from the stopped state is performed, part of the image is skipped because no reading of the original document is performed during acceleration control.

The torque of the stepping motor decreases with an increase in the rotational speed thereof. In the related art, since quick-acceleration control is performed in order to shorten acceleration time, the torque decreases considerably before the document reaches the reading position. As a result, in a document-feeding type image reading apparatus, an auto-document feeder (ADF) mechanism does not function satisfactorily, causing the following problems: (i) double-feeding of the documents, (ii) the motor is out of step when documents are fed which are stacked on one another in the feeding means and which have a large frictional resistance, or (iii) causing defective feeding.

SUMMARY OF THE INVENTION

In view of the above-described problems of the related art, a first object of the present invention is to improve the image reading apparatus.

A second object of the present invention is to provide an image reading apparatus capable of reading a document by causing a document and reading means to move relative to each other even when the relative speed of the document and the reading means is being accelerated or decelerated.

A third object of the present invention is to provide an image reading apparatus in which high-speed reading is made possible even when reading has started in a condition in which the leading edge of the document has already passed the read position before acceleration is performed, that is, reading is possible from the middle of the document by reading the image even when the stepping motor, used for feeding a document in a document-feeding type image reading apparatus, is being accelerated.

A fourth object of the present invention is to provide an image reading apparatus in which high-speed reading is possible even when it is started in a condition in which the optical system is stopped in the middle of the document, that is, even from the middle of the document, by reading the image even when the stepping motor, used for transporting the moving-type optical system, of an image reading apparatus is being accelerated.

To achieve the above objects, according to one aspect of the present invention, there is provided an image reading apparatus comprising: reading means for outputting image data at a fixed cycle; moving means for moving the reading means and a document relative to each other; and control means for extracting supply signals, which supply several types of driving signals of different frequencies to the moving means and for receiving an output from the reading means at a predetermined timing each time the driving signal is detected a predetermined number of times.

According to another aspect of the present invention, there is provided an image reading apparatus in which the separation performance and document feeding performance of the ADF are improved by a method in which, when documents are stacked one on another, the original documents are separated by the ADF and a single document is fed at a low speed with a high torque up to a reading position. Acceleration is started after the document has reached the reading position.

According to another aspect of the present invention, an image reading apparatus includes a reading means for reading a document to generate image data, and for outputting the image data at a predetermined cycle. A reading control means receives the image data output by the reading means. A moving means, driven by a driving means, moves the document and the reading means relative to each other. A timing control means controls (i) a driving timing of the driving means, and (ii) a data timing at which the image data output from the reading means is received by the reading control means. The timing control means controls the driving timing and the data timing such that a moving speed of the document is accelerated, and the image data output from the reading means is selectively received by the reading control means in accordance with the driving timing.

According to yet a further aspect of the present invention, an image reading apparatus includes a reading means for reading a document to generate image data, and for outputting the image data at a predetermined cycle. A reading control means receives the image data output by the reading means. A moving means, driven by a driving means, moves the document and the reading means relative to each other. A timing control means controls (i) a driving timing of the driving means, and (ii) a data timing at which the image data output from the reading means is received by the reading control means. The timing control means controls the driving timing and the data timing such that a moving speed of the document is decelerated, and the image data output from the reading means is selectively received by the reading control means in accordance with the driving timing.

According to still a further aspect of the present invention, an image reading method includes the steps of moving a document and a reading means relative to each other using driving pulses from a driving means; reading the document to generate image data; outputting the image data at a predetermined cycle; selectively extracting image data output at the predetermined cycle at intervals of a predetermined number of driving pulses; changing a pulse rate of the driving pulses; and selectively extracting image data output at a timing nearest to the driving pulse timing at intervals of a predetermined number of pulses at the changed pulse rate in accordance with a preset control table.

The above and further objects and novel features of the invention will more fully appear from the following detailed description when read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a block diagram in accordance with an embodiment of the present invention;

FIG. 2 is a timing chart for acceleration control and reading;

FIG. 6 shows an operation table for instructing deceleration control during memory overflow.

DETAILED DESCRIPTION OF A PREFERRED EMBODIMENT

Figures 3A, 3B:
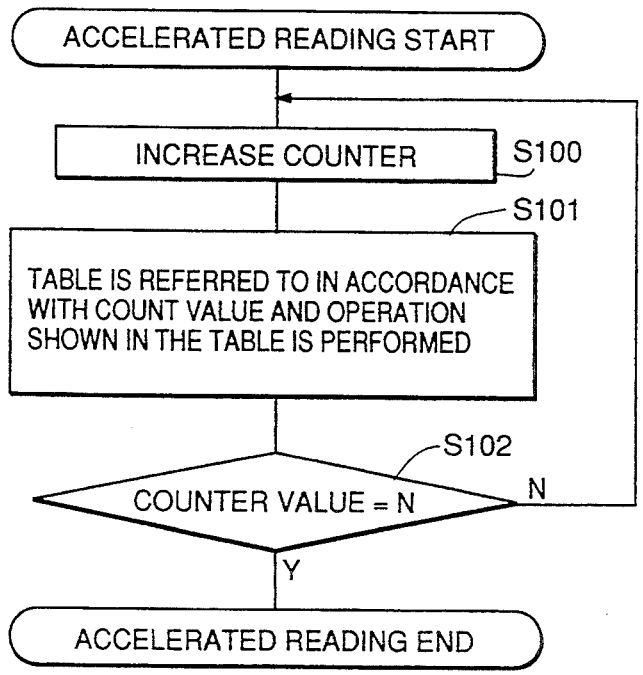
FIG. 3(a) is a flowchart showing acceleration control and the reading operation.
FIG. 3(b) shows an operation table.

An example of an application of the present invention to an image reading apparatus of a document-feeding type used in a facsimile or the like will be explained first.

FIG. 1 is a block diagram for illustrating an image reading section in accordance with an embodiment of the present invention. In FIG. 1, reference numeral 1 denotes a control section; reference numeral 2 denotes a photoelectric conversion section for converting a read image into electrical signals; reference numeral 3 denotes a binarization section for converting electrical signals output from the photoelectric conversion section 2 into binary digital signals of white or black; reference numeral 4 denotes a serial/parallel conversion section for converting serial data output from the binarization section 3 into parallel data of a predetermined bit length which is convenient for the control section 1 to handle; reference numeral 5 denotes a clock generator for generating a data transfer clock for each pixel and a line synchronization signal for each line; reference numeral 6 denotes a storage section for storing read image data; reference numeral 7 denotes a motor driving section for driving a motor in accordance with an instruction from the control section 1; reference numeral 8 denotes a stepping motor for feeding a read document; reference numeral 9 denotes a data transfer clock signal; reference numeral 10 denotes a line synchronization signal; reference numeral 11 denotes a section for detecting the presence of a document; reference numeral 12 denotes an encoding and decoding section for encoding and decoding image data; reference numeral 13 denotes an encoding data storage section for storing encoded data; reference numeral 14 denotes a modem; and reference numeral 15 denotes a network control unit (NCU).

An example will now be explained in which a document is read at the standard resolution mode of a facsimile apparatus by means of the reading apparatus of the facsimile in which a photoelectric conversion section is formed of a CCD (Charge Coupled Device) having a storage time of 2.5 ms, one line of the standard mode (3.851 line/mm) corresponding to 4 steps of a stepping motor for feeding.

The line synchronization signal 10 is generated at a cycle which coincides with the storing operation of the CCD disposed in the photoelectric conversion section 2, and is input to the photoelectric conversion section 2 and the control section 1. A reading operation is performed with this signal as a reference.

When the line synchronization signal 10 is input, the photoelectric conversion section 2 transfers the stored charge for each pixel into a shift register within the CCD, converts the charge into an electrical signal and transfers it into the binarization section 3 in synchronization with the data transfer clock signal 9. Data which is binarized by the binarization section 3 is transferred to the serial/parallel conversion section 4 in synchronization with the data transfer clock signal 9, where the data is converted into parallel data of a predetermined bit length (e.g., 8 bits) which is convenient for the control section to handle. These operations are repeatedly performed each time the line synchronization signal 10 is input.

When the line synchronization signal 10 is input, the control section 1 (i) issues an instruction for stepping up the motor to the motor driving section 7 for stepping up the motor 8 in accordance with a predetermined timing, and (ii) reads one line of data from the serial/parallel conversion section 4 and transfers it to the storage section 6.

Next, an explanation will be given of a method of reading an image at the standard mode while a motor is being accelerated in a system which is controlled with the line synchronization signal 10 as a reference. As an example, the number of rotations of the motor is accelerated from 800 pps to 1,600 pps.

FIG. 2 illustrates the timing of sending instructions to the motor driving section 7 during acceleration control; stepping operations of the motor; and the timing at which image data is received from the CCD. In this embodiment, since the line synchronization signal 10, which is output at intervals of 2.5 m seconds, is used as a reference, the pulse rate of the stepping motor must be controlled on the basis of the cycle of the line synchronization signal 10. In this embodiment, the motor is smoothly accelerated by gradually increasing the pulse rate as shown in FIG. 2 from 4 steps (800 pps), to 5 steps (1,000 pps), 6 steps (1,200 pps), and 7 steps (1,400 pps), all of the foregoing being in 5 ms units, and from 4 steps (1,600 pps) in 2.5 ms units. The timing at which data is output from the CCD is important. Since the standard resolution is used, data must be received at a rate of one line for every 4 steps of the motor. Since, in practice, the data output timing of the CCD is at 2.5 ms intervals, and since 4 steps are scanned in 5 ms for 800 pps, data may be received from the CCD in accordance with a reading timing (output timing of the CCD) of once for every two pulses of the line synchronization signal 10. However, in 1,000 pps, 1,200 pps and 1,400 pps, the timing of the motor at 4 step intervals is out of phase with the output timing of the pulses of the line synchronization signal 10 (data output timing of the CCD). It is impossible to set the read timing at 4 step intervals in a condition in which the timing of the motor matches the output timing of pulses of the line synchronization signal 10 (data output timing of the CCD). Therefore, as shown in FIG. 2, the read timing is set so that data is received by the control section 1 at the timing at which data is output from the CCD, which timing is nearest to every 4 steps of the motor. Even with this setting, almost no distortion is seen in the read image. As a result, it is possible to read an image during acceleration.

Based on the above, a document is fed by ADF to the read position at 800 pps. As shown in FIG. 2, if reading starts when the original document reaches position A and document feeding is accelerated from position B, it is possible to feed the document to the read position with a high torque. Therefore, an image reading section is realized in which the ADF has high separation and feeding capabilities.

Since an acceleration pattern during acceleration control is greatly affected by the torque of the motor and the load of the mechanism, the acceleration pattern is not limited to that shown in FIG. 2.

An explanation will now be given of an operation for receiving an instruction issued by the control section 1 to the motor driving section 7 and a read image with reference to FIG. 3 as regards the reading operation during acceleration control. Initially, when a document is fed and reaches the reading position as a result of an output from the section for detecting the presence of a document 11, the operation shown in the flowchart of FIG. 3(a) is initiated. Upon initiation of the reading operation, the control section 1 detects the line synchronization signal 10 input from the clock generator 5. When the first line synchronization signal is detected, the count value of a counter in the control section is set at 1 in step S100. Next, address 1 in the table shown in FIG. 3(b) is referred to in step S101. This table is made up of 8 bits: the first bit serves as a flag for indicating whether a read image signal output from the S/P conversion section 4 should be received; the second bit serves as a flag for indicating whether a control instruction should be issued to the motor driving section 7; the third to fifth bits serve as a code for indicating the pulse rate of the motor; and the sixth to eighth bits serve as a code for indicating the number of steps. Since address 1 indicates a read timing according to the content of the table, data output from the S/P conversion section 4 is received and an instruction for advancing 4 steps at 800 pps is given to the motor driving section 7. Since the count value is 1, for N>1, in step S102, the process returns to step S100. When the second line synchronization signal is detected in step S100, the count value is set at 2. Then, the process proceeds to step S101 where the table in address 2 is referred to and, based on the table contents, no action is taken. Then, the process proceeds to step S102; since the count value is 2, for N>2, in step S102, the process returns to step S100. When the third line synchronization signal is detected in step S100, data read from the table in address 3 is received in step S101, and, based on the table contents, an instruction for advancing 4 steps at 800 pps is given to the motor driving section 7. In this way, each time a line synchronization signal is detected in step S100, the operation table is referred to on the basis of the count value in step S101, and the operations referred to in the table are performed. When the count value reaches a value N at which the acceleration operation is to be terminated, the acceleration operation is terminated, and the operation shifts to a reading operation at a constant speed. Thereafter, because N=17 in FIG. 3(b), the same operations as contained in address 17 are repeatedly performed until the end of the document is read. This table is stored in a memory within the control section 10 Therefore, the operation for acceleration control can be changed by changing the contents of this table.

Next, a decelerated reading will be explained.

When a plurality of document sheets are read in succession, decelerated reading is performed near the trailing edge of each document in order to make the next sheet synchronize with the feeding of the next document. Decelerated reading is also performed to suspend the reading operation when a memory overflow is likely to occur or to prevent the stepping motor from getting out of step.

Figure 4:
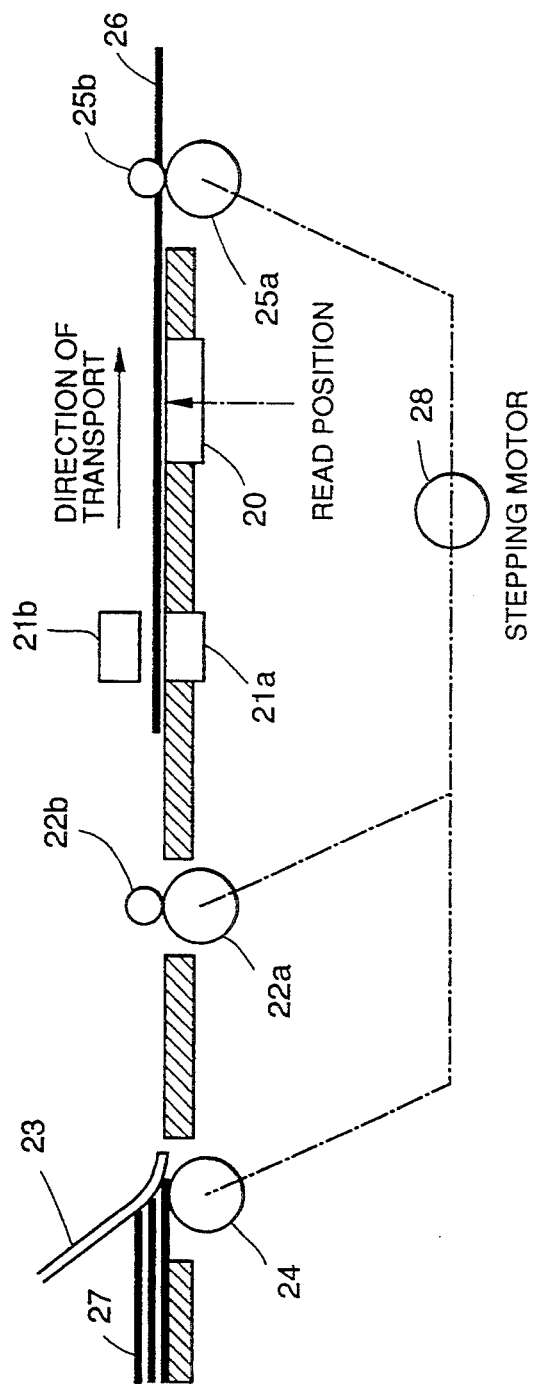
FIG. 4 schematically illustrates a passage through which a document is fed.

The process of reading a plurality of document sheets in succession will be explained first. FIG. 4 shows a schematic diagram of a reading and feeding passage. Reference numeral 20 denotes a reading glass window disposed at the reading position in the feeding passage; reference numerals 21a and 21b denote sensors for detecting the presence of a document; reference numerals 22a and 22b denote feeding rollers for feeding a document to the reading position; reference numeral 23 denotes a document separation member; reference numeral 24 denotes a document separation roller; reference numerals 25a and 25b denote ejection rollers for ejecting a document; reference numeral 26 denotes a document; reference numeral 27 denotes the next or succeeding documents; and reference numeral 28 denotes a stepping motor for driving rollers 22a, 24 and 25a.

Assuming that the original document 26 is being read, the document separation roller 24 begins to rotate when the trailing edge of the original document 26 is detected by the sensors 21a and 21b. Turning on or off the document separation roller 24 is performed by a clutch mechanism or the like. The next document 27, separated by the document separation member 23, is guided to the feeding rollers 22a and 22b. After the leading edge of the next document 27 is detected by the sensors 21a and 21b, the accelerated reading operation described above is performed. Since the rollers 22a, 24 and 25a are driven by a single stepping motor, the rotational speed of each roller is synchronized with the number of rotations of the stepping motor. Therefore, if the leading edge of the next document 27 reaches the feeding rollers 22a and 22b during the time interval from when the trailing edge of the original document 26 being read passes through the sensors 21a and 21b to the time when the original document 26 passes the reading position, the next document 27 is fed at the speed at which the original document 26 is read. That is, if the original document 26 is read up to its trailing edge at a high speed (1,600 pps), the leading edge of the next document 27 reaches the feeding rollers 22a and 22b during that time, and is fed at a high speed (1,600 pp). Therefore, the next page is not fed at a low speed. To prevent high speed feeding, if the trailing edge of the original document 26 is detected passing through the sensors 21a and 21b, deceleration is started in preparation for feeding the next document 27, and the rest of the image of the original document 26 is read while being decelerated.

Regarding decelerated control, the reverse of the above-described accelerated control is performed.

Figures 5A, 5B:
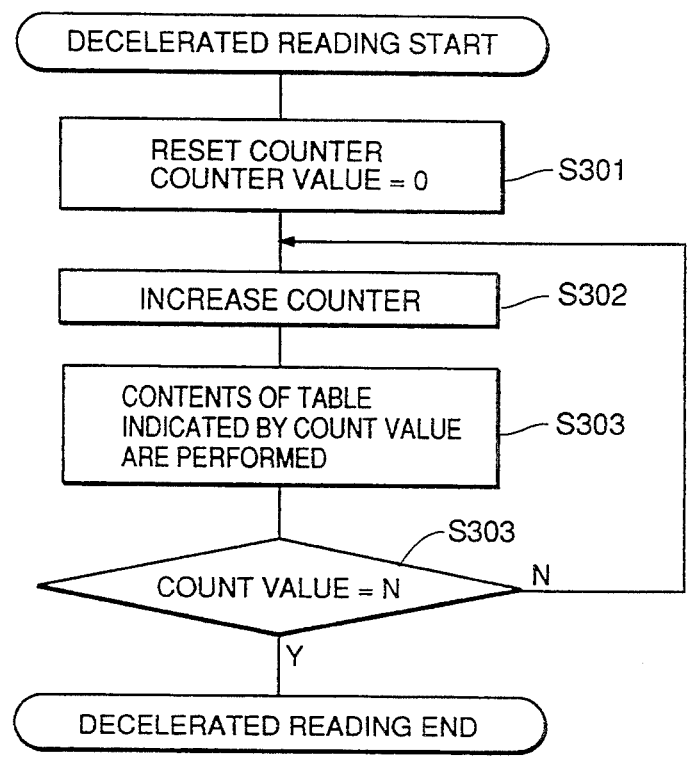
FIG. 5(a) is a flowchart showing deceleration control and the reading operation.
FIG. 5(b) shows an operation table.

Initially, when the trailing edge of the original document 26 is detected by the sensors 21a and 21b, the process shifts to the flowchart shown in FIG. 5(a), and the operations contained in the table in FIG. 5(b) are performed. In FIGS. 5a and 5b, reading is decelerated at timings reverse to the operations shown in FIGS. 3a and 3b.

Next, decelerated reading when a memory overflow occurs will be explained. When image data is transmitted, an image read by the photoelectric conversion section 2 is stored in the storage section 6 via the binarization section 3 and the serial/parallel conversion section 4. Since the image data stored in the storage section 6 are image data for each pixel, they are encoded by the encoding and decoding section 12 and stored in the encoded data storage section 13. Thereafter, image data encoded again by the encoding and decoding section 12 in conformity with the encoding method of a corresponding station is read out from the encoded data storage section 13 and sent out from the NCU 15 to a public switched telephone network via the modem 14. Data for a plurality of sheets can be stored in the encoded data storage section 13. The stored data is read out from the storage section and transmitted. When the image of a document is transmitted, memory overflow may occur in the encoded data storage section 13 depending upon the type of document read or the number of sheets of the document. Therefore, the control section 1 monitors the free space capacity of the encoded data storage section 13. When the free space capacity of the memory falls below a predetermined amount, deceleration control during memory overflow is performed and the reading operation is stopped. This operation is the same as when the trailing edge of the document is detected, as described above, except that a different table is referred to. Initially, in FIG. 5(a), N is set at 7, and reference to the table of FIG. 6 is initiated. At this time, the degree of deceleration is high. However, there is no inconvenience caused, for instance, when the motor suddenly stops without having performed deceleration control. The reason why the motor stops quickly in accordance with the deceleration operation at a memory overflow time shown in FIG. 6 is to save the free space capacity of the memory. That is, if the number of lines to be read until the motor stops is great, a large amount of the free space capacity of the memory is required to store the encoded image data which has been read during that time. This is inefficient. Since the amount of the free space capacity of the memory monitored by the control section 1 is determined in accordance with an image pattern such that the maximum number of bits is required after encoding one line of image data in conformity with the encoding method used, if the number of lines to be read from the point of deceleration until stoppage is great, a considerable amount of free space capacity is required. This is inefficient. Therefore, the deceleration operation during memory overflow is performed to quickly decelerate and stop the motor.

Next, when reading is restarted, the reading may be performed in such a way that it is reaccelerated while monitoring the free space of the encoded data or in such a way that the reading is performed line by line at a low speed and starting and stopping of reading of one line may be repeated at a low speed. Further, even when reading from the middle of the document, the image of the document is read while performing acceleration control.

As described above, since the image may be read while acceleration is being performed, high-speed reading is possible even from the middle of the document. In addition, since an image may be read while acceleration or deceleration is being performed, even when an image is to be transmitted from the middle of the document or when the reading operation is stopped during the reading due to a memory overflow or the like, it is possible to read a well-linked image without image data being lost.

In addition, since the document is fed at a high speed up to the reading position and acceleration is started when the document has reached the reading position, the document separation and feeding capabilities of an ADF can be improved.

Next, the application of the present invention to the optical-system-type image reading apparatus will be explained with reference to a preferred embodiment.

Figure 7:
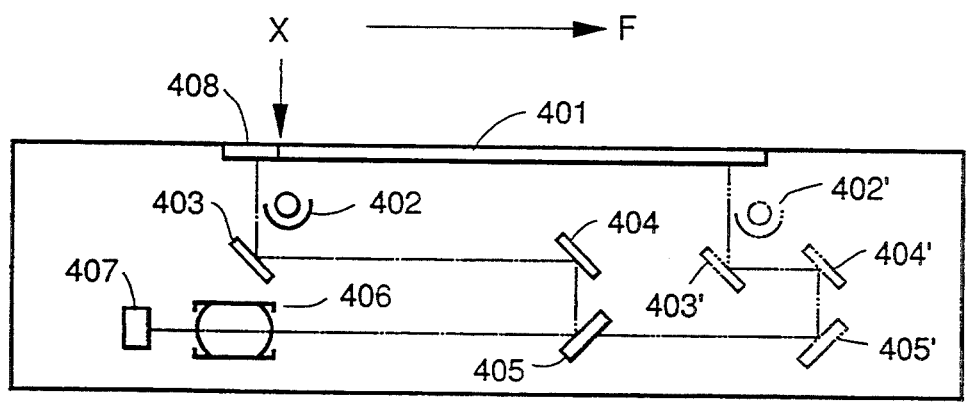
FIG. 7 is a schematic illustration of an image reading apparatus.

FIG. 7 is a schematic illustration of an image reading apparatus.

Reference numeral 401 denotes a glass document holder; reference numeral 402 denotes a bar-shaped light source, such as a halogen or fluorescent lamp; reference numeral 403 denotes a first mirror; reference numeral 404 denotes a second mirror; reference numeral 405 denotes a third mirror; reference numeral 406 denotes a lens; reference numeral 407 denotes a one-dimensional solid-state imaging element (image sensor), such as a CCD line sensor; and reference numeral 408 denotes a white reference surface for correcting the shading.

The operation of a document reading apparatus will be explained. A document placed on the glass document holder 401 is illuminated by the bar-shaped light source 402. The document is formed into an image on the image sensor 407 through the first mirror 403, the second mirror 404 and the third mirror 405 which scan (sub-scan) the document. The main scanning direction of the image sensor 407 is perpendicular to the figure plane.

The bar-shaped light source 402 and the first mirror 403 are formed integrally by means of a support (not shown), and scan the surface of the document while moving in the F direction in the figure, guided by a guide rail (not shown). The second mirror 404 and the third mirror 405 are formed integrally by means of a support (not shown), and moved along a guide rail (not shown) at a speed one half of the speed of the first mirror 403 and in the same direction as the first mirror 403.

The bar-shaped light source 402, the first mirror 403, the second mirror 404 and the third mirror 405 move to the positions 402', 403', 404' and 405', respectively, indicated by the dotted lines in the figure. At this time, the optical path from the document holder 401 to the lens 406 through the mirrors 403, 404 and 405 is maintained at a constant length. The above movements are performed by supplying driving signals to the pulse motor (not shown).

Therefore, if, during sub-scanning, signals from a photoreceptor element of the image sensor 407 are read out in the right order, sequential signals by raster scanning the surface of the document can be obtained.

In the reading position in FIG. 7, the white reference surface for correcting the shading is positioned at the home position. When the document on the glass document holder 401 is read, the bar-shaped light source 402 at the home position and the mirrors 403, 404 and 405 are moved by a pulse motor. At this time, the image sensor 407 and the pulse motor are driven under the control described in connection with FIGS. 2 and 3. At this time, the read start position (point X) on the document holder in FIG. 7 corresponds to point A in FIG. 2. Therefore, the optical system which begins to move from the home position is driven at 800 pps. After the optical system reaches point X in FIG. 7 (point A in FIG. 2), reading is started under the control described in connection with FIG. 3. Further, the moving optical system may be accelerated from the home position so that read data may be taken in from the position where the moving optical system has reached point X in FIG. 7.

Next, the suspension of reading will be explained. This is the same as the operation of the reading apparatus of the document feeding type. Reading is suspended under the control, described in connection with FIG. 6, of an unillustrated control section. A deceleration operation can also be performed if necessary. This operation is performed under the control described in connection with FIG. 5.

The individual components shown in outline or designated by blocks in the Drawings are all well known in the image reading arts and their specific construction and operation are not critical to carrying out the operation or best mode for carrying out the invention.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An image reading apparatus, comprising:
   reading means for reading a document to generate image data, and for outputting the image data at a predetermined cycle;
   reading control means for receiving the image data output by said reading means;
   moving means for moving the document and said reading means relative to each other;
   driving means for driving said moving means by continuously outputting pulses;
   timing control means for controlling (i) the output of the pulses by said driving means, and (ii) a timing at which the image data output from said reading means is received by said reading control means to select desired one of the image data output cyclically by said reading means,
   wherein said timing control means controls the output of the pulses and the receiving timing such that a moving speed of said moving means is continuously accelerated, and said timing control means controls the receiving timing such that the distortion of the image data received by said reading control means is reduced.

2. An image reading apparatus according in claim 1, wherein said moving means includes a pulse motor.

3. An image reading apparatus according to claim 2, wherein said driving means outputs the driving pulses for said pulse motor.

4. An image reading apparatus according to claim 1, wherein said timing control means controls a pulse rate of the driving pulses.

5. An image reading apparatus according to claim 1, wherein said timing control means performs control such that the image data output from said reading means is received by said reading control means at intervals of a predetermined number of driving pulses.

6. An image reading apparatus according to claim 5, wherein said timing control means performs control such that the image data output from said reading means is received by said reading control means, the image data being output at a timing nearest to the driving pulse output timing at the intervals of the predetermined number of driving pulses.

7. An image reading apparatus according to claim 1, further comprising a memory, wherein the data timing at which said reading control means receives the image data output from said reading means is stored in the memory as a preset control table.

8. An image reading apparatus according to claim 1, wherein said moving means includes feeding means for feeding the document.

9. An image reading apparatus according to claim 8, wherein said moving means further includes detecting means for detecting a position of the document.

10. An image reading apparatus according to claim 9, wherein said timing control means starts acceleration control after a leading edge of the document has reached a reading position at which the document is read by said reading means in response to an output from said detecting means.

11. An image reading apparatus according to claim 1, further comprising:
   a document holder in which the document is set; and
   a moving optical system for scanning the document in said document holder, and for guiding image data to said reading means, wherein said moving means moves said moving optical system.

12. An image reading apparatus, comprising:
   reading means for reading a document to generate image data, and for outputting the image data at a predetermined cycle;

reading control means for receiving the image data output by said reading means;

moving means for moving the document and said reading means relative to each other;

driving means for driving said moving means by continuously outputting pulses;

timing control means for controlling (i) the output of the pulses by said driving means, and (ii) a timing at which the image data output from said reading means is received by said reading control means to select desired one of the image data output cyclically by said reading means, wherein said timing control means controls the output of the pulses and the receiving timing such that a moving speed of said moving means is continuously decelerated, and said timing control means controls the receiving timing such that the distortion of the image data received by said reading control means is reduced.

13. An image reading apparatus according to claim 12, wherein said moving means includes a pulse motor.

14. An image reading apparatus according to claim 13, wherein said driving means outputs the driving pulses for said pulse motor.

15. An image reading apparatus according to claim 12, wherein said timing control means controls a pulse rate of the driving pulses.

16. An image reading apparatus according to claim 12, wherein said timing control means performs control such that the image data output from said reading means is received by said reading control means at intervals of a predetermined number of driving pulses.

17. An image reading apparatus according to claim 16, wherein said timing control means performs control such that the image data output from said reading means is received by said reading control means, the image data being output at a timing nearest to the driving pulse output timing at the intervals of the predetermined number of driving pulses.

18. An image reading apparatus according to claim 12, further comprising a memory, wherein the timing at which said reading control means receives the image data output from said reading means is stored in the memory as a preset control table.

19. An image reading apparatus according to claim 12, wherein said moving means includes feeding means for feeding the document.

20. An image reading apparatus according to claim 19, wherein said moving means further includes detecting means for detecting a position of the document.

21. An image reading apparatus according to claim 20, wherein said timing control means starts deceleration control before an edge of the document has reached a reading position at which the document is read by said reading means in response to an output from said detecting means.

22. An image reading apparatus according to claim 21, wherein said timing control means terminates deceleration control before the end edge of the document has reached the reading position.

23. An image reading apparatus according to claim 22, wherein said feeding means starts to feed a next document to the reading position before the document which has been read is ejected.

24. An image reading method, comprising the steps of:

moving a document and a reading image relative to each other using driving pulses from a driving means;

reading the document to generate image data;

outputting the image data at a predetermined cycle;

selectively extracting image data output at the predetermined cycle at intervals of a predetermined number of driving pulses; and changing a pulse rate of the driving pulses; and selectively extracting image data output at a timing nearest to the driving pulse timings at intervals of a predetermined number of pulses at the changed pulse rate in accordance with a preset control table.

25. An image reading apparatus, comprising:

reading means for reading a document to generate image data, and for outputting the image data at a predetermined cycle;

reading control means for receiving the image data output by said reading means;

moving means for moving the document and said reading means relative to each other;

driving means for driving said moving means by continuously outputting pulses;

timing control means for controlling (i) the output of the pulses by said driving means, and (ii) a timing at which the image data output from said reading means is received by said reading control means to select desired one of the image data output cyclically by said reading means, wherein said timing control means controls the output of the pulses such that a moving speed of said moving means is continuously accelerated, and said timing control means controls the receiving timing such that the distortion of the image data received by said reading control means is reduced.

26. An image reading apparatus according to claim 25, wherein said moving means includes a pulse motor, and said driving means outputs the driving pulses for said pulse motor, and said timing control means controls a pulse rate of the driving pulses.

27. An image reading apparatus according to claim 25, wherein said timing control means performs control such that the image data output from said reading means is received by said reading control means, the image data being output at a timing nearest to the driving pulse output timing at the intervals of the predetermined number of driving pulses, further comprising a memory, wherein the timing at which said reading control means receives the image data output from said reading means is stored in the memory as a preset control table.

28. An image reading apparatus according to claim 25, wherein said moving means includes feeding means for feeding the document, and said moving means further includes detecting means for detecting a position of the document, and said timing control means starts acceleration control after a leading edge of the document has reached a reading position at which the document is read by said reading means in response to an output from said detecting means.

29. An image reading apparatus according to claim 25, further comprising:

a document holder in which the document is set; and a moving optical system for scanning the document in said document holder, and for guiding image data to said reading means, wherein said moving means moves said moving optical system.

30. An image reading apparatus, comprising:
reading means for reading a document to generate image data, and for outputting the image data at a predetermined cycle;
reading control means for receiving the image data output by said reading means;
moving means for moving the document and said reading means relative to each other;
driving means for driving said moving means by continuously outputting pulses;
timing control means for controlling (i) the output of the pulses by said driving means, and (ii) a timing at which the image data output from said reading means is received by said reading control means to select desired one of the image data output cyclically by said reading means,
wherein said timing control means controls the output of the pulses such that a moving speed of said moving means is continuously decelerated, and said timing control means controls the receiving timing such that the distortion of the image data received by said reading control means is reduced.

31. An image reading apparatus according to claim 30, wherein said moving means includes a pulse motor, and said driving means outputs the driving pulses for said pulse motor,
and said timing control means controls a pulse rate of the driving pulses.

32. An image reading apparatus according to claim 30, wherein said timing control means performs control such that the image data output from said reading means is received by said reading control means, the image data being output at a timing nearest to the driving pulse output timing at the intervals of the predetermined number of driving pulses,
further comprising a memory, wherein the timing at which said reading control means receives the image data output from said reading means is stored in the memory as a preset control table.

33. An image reading apparatus according to claim 30, wherein said moving means includes feeding means for feeding the document,
and said moving means further includes detecting means for detecting a position of the document,
and said timing control means starts deceleration control before an end edge of the document has reached a reading position at which the document is read by said reading means in response to an output from said detecting means.

34. An image reading apparatus according to claim 33, wherein said timing control means terminates deceleration control before the end edge of the document has reached the reading position.

35. An image reading apparatus, comprising:
reading means for reading a document to generate image data, and for outputting the image data at a predetermined cycle;
reading control means for receiving the image data output by said reading means;
moving means for moving the document and said reading means relative to each other;
driving means for driving said moving means;
timing control means for performing a first process for controlling a driving timing of said driving means, and a second process for controlling a timing at which the image data output from said reading means is received by said reading control means,
wherein said timing control means controls the driving timing and the data timing such that a moving speed of the relative movement is accelerated, and the image data output from said reading means is selectively received by said reading control means, and
wherein said timing control means performs said first process and said second process by time sharing such that said first process and said second process are performed in parallel.

36. An image reading apparatus according to claim 35, wherein said moving means includes a pulse motor, and said driving means outputs a plurality of driving pulses for said moving means,
and said timing control means controls a pulse rate of the plurality of driving pulses.

37. An image reading apparatus according to claim 35, wherein said timing control means performs control such that the image data output from said reading means is received by said reading control means, the image data being output at a timing nearest to the driving pulse output timing at the intervals of the predetermined number of driving pulses,
further comprising a memory, wherein the timing at which said reading control means receives the image data output from said reading means is stored in the memory as a preset control table.

38. An image reading apparatus according to claim 35, wherein said moving means includes feeding means for feeding the document,
and said moving means further includes detecting means for detecting a position of the document,
and said timing control means starts acceleration control after a leading edge of the document has reached a reading position at which the document is read by said reading means in response to an output from said detecting means.

39. An image reading apparatus according to claim 35, further comprising:
a document holder in which the document is set;
a moving optical system for scanning the document in said document holder, and for guiding image data to said reading means, wherein said moving means moves said moving optical system.

40. An image reading apparatus, comprising:
reading means for reading a document to generate image data, and for outputting the image data at a predetermined cycle;
reading control means for receiving the image data output by said reading means;
moving means for moving the document and said reading means relative to each other;
driving means for driving said moving means;
timing control means for performing a first process for controlling a driving timing of said driving means, and a second process for controlling a timing at which the image data output from said reading means is received by said reading control means,
wherein said timing control means controls the driving timing and the data timing such that a moving speed of the relative movement is decelerated, and the image data output from said reading means is selectively received by said reading control means, and wherein said timing control means performs said first process and said second process by time sharing such that said first process and said second process are performed in parallel.

41. An image reading apparatus according to claim 40, wherein said moving means includes a pulse motor,
and said driving means outputs a plurality of driving pulses for said moving means,
and said timing control means controls a pulse rate of the plurality of driving pulses.

42. An image reading apparatus according to claim 40, wherein said timing control means performs control such that the image data output from said reading means is received by said reading control means, the image data being output at a timing nearest to the driving pulse output timing at the intervals of the predetermined number of driving pulses,
further comprising a memory, wherein the timing at which said reading control means receives the image data output from said reading means is stored in the memory as a preset control table.

43. An image reading apparatus according to claim 40, wherein said moving means includes feeding means for feeding the document,
and said moving means further includes detecting means for detecting a position of the document,
and said timing control means starts acceleration control after a leading edge of the document has reached a reading position at which the document is read by said reading means in response to an output from said detecting means.

44. An image reading apparatus according to claim 43, wherein said timing control means terminates deceleration control before the leading edge of the document has reached the reading position.

45. An image reading apparatus, comprising:
reading means for reading a document to generate image data, and for outputting the image data at a predetermined cycle;
reading control means for receiving the image data output by said reading means;
moving means for moving the document and said reading means relative to each other;
driving means for driving said moving means;
timing control means for controlling (i) a driving timing of said driving means, and (ii) a timing at which the image data output from said reading means is received by said reading control means, and
a memory for storing information relating to the timing, at which said reading control means receives the image output from said reading means, as a preset control table,
wherein said timing control means controls the driving timing and the data timing such that a moving speed of the document is accelerated, and the image data output from said reading means is selectively received by said reading control means in accordance with the information stored in said memory.

46. An image reading apparatus according to claim 45, wherein said moving means includes a pulse motor,
and said driving means outputs a plurality of driving pulses for said moving means,
and said timing control means controls a pulse rate of the plurality of driving pulses.

47. An image reading apparatus according to claim 45, wherein said timing control means performs control such that the image data output from said reading means is received by said reading control means, the image data being output at a timing nearest to the driving pulse output timing at the intervals of the predetermined number of driving pulses.

48. An image reading apparatus according to claim 45, wherein said moving means includes feeding means for feeding the document,
and said moving means further includes detecting means for detecting a position of the document;
and said timing control means starts acceleration control after a leading edge of the document has reached a reading position at which the document is read by said reading means in response to an output from said detecting means.

49. An image reading apparatus according to claim 45, further comprising:
a document holder in which the document is set; and
a moving optical system for scanning the document in said document holder, and for guiding image data to said reading means, wherein said moving means moves said moving optical system.

50. An image reading apparatus, comprising:
reading means for reading a document to generate image data, and for outputting the image data at a predetermined cycle;
reading control means for receiving the image data output by said reading means;
moving means for moving the document and said reading means relative to each other;
driving means for driving said moving means;
timing control means for controlling (i) a driving timing of said driving means, and (ii) a timing at which the image data output from said reading means is received by said reading control means, and
a memory for storing information relating to the timing, at which said reading control means receives the image data output from said reading means, as a preset control table,
wherein said timing control means controls the driving timing and the data timing such that a moving speed of the document is decelerated, and the image data output from said reading means is selectively received by said reading control means in accordance with the information stored in said memory.

51. An image reading apparatus according to claim 50, wherein said moving means includes a pulse motor,
and said driving means outputs a plurality of driving pulses for said moving means,
and said timing control means controls a pulse rate of the plurality of driving pulses.

52. An image reading apparatus according to claim 50, wherein said timing control means performs control such that the image data output from said reading means is received by said reading control means, the image data being output at a timing nearest to the driving pulse output timing at the intervals of the predetermined number of driving pulses.

53. An image reading apparatus according to claim 50, wherein said moving means includes feeding means for feeding the document,
and said moving means further includes detecting means for detecting a position of the document,
and said timing control means starts acceleration control after a leading edge of the document has reached a reading position at which the document is read by said reading means in response to an output from said detecting means.

54. An image reading apparatus according to claim 53, wherein said timing control means terminates deceleration control before the leading edge of the document has reached the reading position.

55. An method on an image reading apparatus, said method comprising the steps of:
reading a document, using reading means, to generate image data, and outputting the image data at a predetermined cycle;
receiving the image data output at said reading step;
moving, using moving means, the document and the reading means relative to each other;
driving the moving means by continuously outputting pulses;
controlling (i) the output of the pulses at said driving step, and (ii) a timing at which the image data output at said reading step is received at said receiving step to select desired one of the image data output cyclically at said reading step,
wherein, at said controlling step, the output of the pulses and the receiving timing is controlled such that a moving speed of said moving step is continuously accelerated, and the receiving timing is controlled such that the distortion of the image data received at said receiving step is reduced.

56. A method according to claim 55, wherein, at said controlling step, a pulse rate of the driving pulses is controlled.

57. A method according to claim 55, wherein said controlling step performs control such that the image data output at said reading step is received at said receiving step intervals of a predetermined number of driving pulses.

58. A method according to claim 55, further comprising a storing step of storing the data timing at which said receiving step receives the image data output at said reading step as a preset control table.

59. A method on an image reading apparatus, said method comprising the steps of:
reading a document, using a reading means, to generate image data, and outputting the image data at a predetermined cycle;
receiving the image data output at said reading step;
moving, using moving means, the document and the reading means relative to each other;
driving the moving means by continuously outputting pulses;
controlling (i) the output of the pulses at said driving step, and (ii) a timing at which the image data output at said reading step is received at said receiving step to select desired one of the image data output cyclically at said reading step,
wherein, at said controlling step, the output of the pulses and the receiving timing is controlled such that a moving speed of said moving step is continuously decelerated, and the receiving timing is controlled such that the distortion of the image data received at said receiving step is reduced.

60. A method according to claim 59, wherein, at said controlling step, a pulse rate of the driving pulses is controlled.

61. A method according to claim 59, wherein said controlling step performs control such that the image data output at said reading step is received at said receiving step at intervals of a predetermined number of driving pulses.

62. A method according to claim 59, further comprising a storing step of storing the timing at which said receiving step receives the image data output at said reading step as a preset control table.

63. A method according to claim 59, wherein said moving step includes a feeding step of feeding the document and said moving step includes a detecting step of detecting the position of the document.

64. A method according to claim 63, wherein said controlling step starts deceleration control before an edge of the document has reached a reading position at which the document is read at said reading step in response to an output from said detecting step.

65. A method according to claim 64, wherein said controlling step terminates deceleration control before the end edge of the document has reached the reading position.

66. A method on an image reading apparatus, said method comprising the steps of:
reading a document, using reading means, to generate image data, and outputting the image data at a predetermined cycle;
receiving the image data output at said reading step;
moving, using moving means, the document and the reading means relative to each other;
driving the moving means by continuously outputting pulses;
controlling (i) the output of the pulses at said driving step, and (ii) a timing at which the image data output at said reading step is received at said receiving step to select desired one of the image data output cyclically at said reading step,
wherein, at said controlling step, the output of the pulses is controlled such that a moving speed of said moving step is continuously accelerated, and the receiving timing is controlled such that the distortion of the image data received at said receiving step is reduced.

67. A method according to claim 66, wherein said moving step utilizes a pulse motor,
and said driving step outputs the driving pulses for the pulse motor,
and said controlling step controls a pulse rate of the driving pulses.

68. A method according to claim 66, wherein said controlling step performs control such that the image data output at said reading step is received by said receiving step, the image data being output at a timing nearest to the driving pulse output timing at the intervals of the predetermined number of driving pulses, and wherein the method further comprises storing the timing at which said receiving step receives the image data output from said reading step as a preset control table.

69. A method according to claim 66, wherein said moving step includes a feeding step of feeding the document,
and said moving step further includes a detecting step of detecting a position of the document,
and said controlling step starts acceleration control after a leading edge of the document has reached a reading position at which the document is read by said reading step in response to an output from said detecting step.

70. A method according to claim 66, further comprising the steps of:
providing a document holder in which the document is set; and scanning, using a moving optical system, the document in the document holder, and guiding image data to the reading means, wherein said moving step moves the moving optical system.

71. A method on an image reading apparatus, said method comprising the steps of:

reading a document, using reading means, to generate image data, and outputting the image data at a predetermined cycle;

receiving the image data output at said reading step;

moving, using moving means, the document and the reading means relative to each other;

driving the moving means by continuously outputting pulses;

controlling (i) the output of the pulses at said driving step, and (ii) a timing at which the image data output at said reading step is received at said receiving step to select desired one of the image data output cyclically at said reading step, wherein, at said controlling step, the output of the pulses is controlled such that a moving speed of said moving step is continuously decelerated, and the receiving timing is controlled such that the distortion of the image data received at said receiving step is reduced.

72. A method according to claim 71, wherein said moving step utilizes a pulse motor, and said driving step outputs the driving pulses for the pulse motor, and said controlling step controls a pulse rate of the driving pulses.

73. A method according to claim 71, wherein said controlling step performs control such that the image data output at said reading step is received at said receiving step, the image data being output at a timing nearest to the driving pulse output timing at the intervals of the predetermined number of driving pulses, and wherein the method further comprises storing the timing at which said receiving step receives the image data output at said reading step is stored as a preset control table.

74. A method according to claim 71, wherein said moving step includes a feeding step of feeding the document, and said moving step further includes a detecting step of detecting a position of the document, and said controlling step starts deceleration control before an end edge of the document has reached a reading position at which the document is read by said reading step in response to an output from said detecting step.

75. A method according to claim 74, wherein said controlling step terminates deceleration control before the end edge of the document has reached the reading position.

76. A method on an image reading apparatus, said method comprising the steps of:

reading a document, using reading means, to generate image data, and outputting the image data at a predetermined cycle;

receiving the image data output at said reading step;

moving, using moving means, the document and the reading means relative to each other;

driving the moving means;

performing a first process for controlling a driving timing of said driving step, and a second process for controlling a timing at which the image data output at said reading step is received at said receiving step, wherein said performing step controls the driving timing and the data timing such that a moving speed of the relative movement is accelerated, and the image data output at said reading step is selectively received at said receiving step, and wherein said performing step performs said first process and said second process by time sharing such that said first process and said second process are performed in parallel.

77. A method according to claim 76, wherein said moving step utilizes a pulse motor, and said driving step outputs a plurality of driving pulses for said moving step, and said performing step controls a pulse rate of the plurality of driving pulses.

78. A method according to claim 76, wherein said performing step performs control such that the image data output from said reading step is received by said receiving step, the image data being output at a timing nearest to the driving pulse output timing at the intervals of the predetermined number of driving pulses, and wherein said method further comprises storing the timing at which said receiving step receives the image data output from said reading step as a preset control table.

79. A method according to claim 76, wherein said moving step includes a feeding step of feeding the document, and said moving step further includes a detecting step of detecting a position of the document, and said performing step starts acceleration control after a leading edge of the document has reached a reading position at which the document is read at said reading step in response to an output from said detecting step.

80. A method according to claim 76, further comprising:

providing a document holder in which the document is set;

scanning, using a moving optical system, the document in the document holder, and guiding image data to the reading means, wherein said moving step moves the moving optical system.

81. A method on an image reading apparatus, said method comprising the steps of:

reading a document, using reading means, to generate image data, and outputting the image data at a predetermined cycle;

receiving the image data output at said reading step;

moving, using moving means, the document and the reading means relative to each other;

driving the moving means;

performing a first process for controlling a driving timing of said driving step, and a second process for controlling a timing at which the image data output at said reading step is received by said receiving step, wherein said performing step controls the driving timing and the data timing such that a moving speed of the relative movement is decelerated, and the image data output at said reading step is selectively received at said receiving step, and wherein said performing step performs said first process and said second process by time sharing such that said first process and said second process are performed in parallel.

82. A method according to claim 81, wherein said moving step utilizes a pulse motor, and said driving step outputs a plurality of driving pulses for said moving step, and said performing step controls a pulse rate of the plurality of driving pulses.

83. A method according to claim 81, wherein said performing step performs control such that the image data output from said reading step is received by said receiving step, the image data being output at a timing nearest to the driving pulse output timing at the intervals of the predetermined number of driving pulses, and wherein said method further comprises storing the timing at which said receiving step receives the image data output from said reading step as a preset control table.

84. A method according to claim 81, wherein said moving step includes a feeding step of feeding the document, and said moving step further includes a detecting step of detecting a position of the document, and said performing step starts acceleration control after a leading edge of the document has reached a reading position at which the document is read at said reading step in response to an output from said detecting step.

85. A method according to claim 84, wherein said performing step terminates deceleration control before the leading edge of the document has reached the reading position.

86. A method on an image reading apparatus, said method comprising the steps of:

reading a document, using reading means, to generate image data, and outputting the image data at a predetermined cycle;

receiving the image data output at said reading step;

moving, using moving means, the document and the reading means relative to each other;

driving the moving means;

controlling (i) a driving timing of said driving step, and (ii) a timing at which the image data output at said reading step is received by said receiving step, and storing information relating to the timing, at which said receiving step receives the image output at said reading step, as a preset control table, wherein said controlling step controls the driving timing and the data timing such that a moving speed of the document is accelerated, and the image data output at said reading step is selectively received at said receiving step in accordance with the information stored at said storing step.

87. A method according to claim 86, wherein said moving step utilizes a pulse motor, and said driving step outputs a plurality of driving pulses for said moving step, and said controlling step controls a pulse rate of the plurality of driving pulses.

88. A method according to claim 86, wherein said controlling step performs control such that the image data output at said reading step is received at said receiving step, the image data being output at a timing nearest to the driving pulse output timing at the intervals of the predetermined number of driving pulses.

89. A method according to claim 86, wherein said moving step includes a feeding step of feeding the document, and said moving step further includes detecting step of detecting a position of the document;

and said controlling step starts acceleration control after a leading edge of the document has reached a reading position at which the document is read at said reading step in response to an output from said detecting step.

90. A method according to claim 86, further comprising the steps of:

providing a document holder in which the document is set; and scanning, using a moving optical system, the document in the document holder, and guiding image data to the reading means, wherein said moving step moves said moving optical system.

91. A method on an image reading apparatus, said method comprising the steps of:

reading a document, using reading means, to generate image data, and outputting the image data at a predetermined cycle;

receiving the image data output at said reading step;

moving, using moving means, the document and the reading means relative to each other;

driving the moving means;

controlling (i) a driving timing of said driving step, and (ii) a timing at which the image data output from at reading step is received by at said receiving step, and storing information relating to the timing, at which said receiving step receives the image data output at said reading step, as a preset control table, wherein said controlling step controls the driving timing and the data timing such that a moving speed of the document is decelerated, and the image data output at said reading step is selectively received at said receiving step in accordance with the stored information.

92. A method according to claim 91, wherein said moving step utilizes a pulse motor, and said driving step outputs a plurality of driving pulses for said moving step, and said controlling step controls a pulse rate of the plurality of driving pulses.

93. A method according to claim 91, wherein said controlling step performs control such that the image data output at said reading step is received at said receiving step, the image data being output at a timing nearest to the driving pulse output timing at the intervals of the predetermined number of driving pulses.

94. A method according to claim 91, wherein said moving step includes a feeding step of feeding the document, and said moving step further includes a detecting step of detecting a position of the document, and said controlling step starts acceleration control after a leading edge of the document has reached a reading position at which the document is read at said reading step in response to an output from said detecting step.

95. A method according to claim 94, wherein said controlling step terminates deceleration control before the leading edge of the document has reached the reading position.

96. An image reading apparatus according to claim 12, further comprising:

a document holder in which the document is set; and a moving optical system for scanning the document in said document holder, and for guiding image data to said reading means, wherein said moving means moves said moving optical system.

97. An image reading apparatus according to claim 30, further comprising:
   a document holder in which the document is set; and
   a moving optical system for scanning the document in said document holder, and for guiding image data to said reading means, wherein said moving means moves said moving optical system.

98. An image reading apparatus according to claim 40, further comprising:
   a document holder in which the document is set; and
   a moving optical system for scanning the document in said document holder, and for guiding image data to said reading means, wherein said moving means moves said moving optical system.

99. An image reading apparatus according to claim 50, further comprising:
   a document holder in which the document is set; and
   a moving optical system for scanning the document in said document holder, and for guiding image data to said reading means, wherein said moving means moves said moving optical system.

100. A method according to claim 59, further comprising the steps of:
   providing a document holder in which the document is set; and
   scanning, using a moving optical system, the document in the document holder, and guiding image data to the reading means, wherein said moving step moves the moving optical system.

101. A method according to claim 71, further comprising the steps of:
   providing a document holder in which the document is set; and
   scanning, using a moving optical system, the document in the document holder, and guiding image data to the reading means, wherein said moving step moves the moving optical system.

102. A method according to claim 81, further comprising the steps of:
   providing a document holder in which the document is set; and
   scanning, using a moving optical system, the document in the document holder, and guiding image data to the reading means, wherein said moving step moves the moving optical system.

103. A method according to claim 91, further comprising the steps of:
   providing a document holder in which the document is set; and
   scanning, using a moving optical system, the document in the document holder, and guiding image data to the reading means, wherein said moving step moves the moving optical system.

* * * * *

UNITED STATES PATENT AND TRADEMARK OFFICE
CERTIFICATE OF CORRECTION

PATENT NO.   : 5,444,555
DATED        : August 22, 1995
INVENTOR(S)  : Takashi Ono It is certified that error appears in the above-indentified patent and that said Letters Patent is hereby corrected as shown below:

COLUMN 6

Line 31, "10" should read --1.--.

COLUMN 10

Line 6, "pulses;" should read --pulses; and--.

COLUMN 11

Line 6, "pulses;" should read --pulses; and--.

COLUMN 12

Line 8, "and" should be deleted.
Line 23, "pulses;" should read --pulses; and--.

COLUMN 13

Line 12, "pulses;" should read --pulses; and--.
Line 64, "means;" should read --means; and--.

COLUMN 14

Line 56, "means;" should read --means; and--.

COLUMN 15

Line 48, "means," should read --means;--.

UNITED STATES PATENT AND TRADEMARK OFFICE
CERTIFICATE OF CORRECTION

PATENT NO. : 5,444,555

DATED : August 22, 1995

INVENTOR(S) : Takashi Ono

It is certified that error appears in the above-indentified patent and that said Letters Patent is hereby corrected as shown below:

COLUMN 16

Line 35, "means," should read --means;--.

COLUMN 17

Line 16, "pulses;" should read --pulses; and--.
    Line 49, "pulses;" should read --pulses; and--.

COLUMN 18

Line 27, "pulses;" should read --pulses; and--.

COLUMN 19

Line 14, "pulses;" should read --pulses; and--.
    Line 65, "means;" should read --means; and--.

COLUMN 20

Line 41, "set;" should read --set; and--.
    Line 54, "means;" should read --means; and--.

COLUMN 21

Line 43, "step," should read --step;--.

UNITED STATES PATENT AND TRADEMARK OFFICE
CERTIFICATE OF CORRECTION

PATENT NO. : 5,444,555

DATED : August 22, 1995

INVENTOR(S) : Takashi Ono

It is certified that error appears in the above-indentified patent and that said Letters Patent is hereby corrected as shown below:

<u>COLUMN 22</u>

Line 28, "step," should read --step;--.

Signed and Sealed this

Ninth Day of January, 1996

BRUCE LEHMAN

*Attest:*

*Attesting Officer*   *Commissioner of Patents and Trademarks*